US011882048B2

United States Patent
Nakata

(10) Patent No.: US 11,882,048 B2
(45) Date of Patent: Jan. 23, 2024

(54) RELAY DEVICE FOR RELAYING SIGNAL BETWEEN COMMUNICATION LINE AND CLIENT, RELAY METHOD FOR THE SAME AND NON-TRANSITORY COMPUTER READABLE STORAGE MEDIUM FOR THE SAME

(71) Applicant: DENSO CORPORATION, Kariya (JP)

(72) Inventor: Tsuneo Nakata, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/982,646

(22) Filed: Nov. 8, 2022

(65) Prior Publication Data

US 2023/0188473 A1    Jun. 15, 2023

(30) Foreign Application Priority Data

Dec. 9, 2021   (JP) ................................ 2021-200243

(51) Int. Cl.
  *H04L 47/27*   (2022.01)
  *H04B 7/155*   (2006.01)
  *H04L 1/00*   (2006.01)

(52) U.S. Cl.
  CPC ......... *H04L 47/27* (2013.01); *H04B 7/15557* (2013.01); *H04L 1/0076* (2013.01)

(58) Field of Classification Search
  CPC .......................... H04L 47/27; H04B 7/15557
  See application file for complete search history.

(56) References Cited

U.S. PATENT DOCUMENTS

2018/0220325 A1* 8/2018 Lee .................... H04W 72/543
2020/0404522 A1* 12/2020 Sun ....................... H04W 24/08

FOREIGN PATENT DOCUMENTS

| CN | 108777607 A | * 11/2018 | ........... H04L 1/1812 |
| JP | 2010-219802 A | 9/2010 | |

* cited by examiner

*Primary Examiner* — Jackie Zuniga Abad
(74) *Attorney, Agent, or Firm* — Harness, Dickey & Pierce, P.L.C.

(57) ABSTRACT

A target communication line defined as a congestion determination target and a client that transmits an ACK signal to a communication partner in a case where a signal is received from the communication partner are relayed to each other. It is determined whether a congestion occurs on a target communication line. A communication of the ACK signal is limited by a capture process that captures the signal communicated by the client in a case where determining that the congestion occurs on the target communication line.

8 Claims, 7 Drawing Sheets

RELAY DEVICE FOR RELAYING SIGNAL BETWEEN COMMUNICATION LINE AND CLIENT, RELAY METHOD FOR THE SAME AND NON-TRANSITORY COMPUTER READABLE STORAGE MEDIUM FOR THE SAME

CROSS REFERENCE TO RELATED APPLICATIONS

The present application claims the benefit of priority from Japanese Patent Application No. 2021-200243 filed on Dec. 9, 2021. The entire disclosure of the above application is incorporated herein by reference.

TECHNICAL FIELD

The present disclosure relates to a relay device, a relay method, and a non-transitory tangible computer readable storage medium for relaying signals, and particularly to a technique for reducing congestion.

BACKGROUND

The in-vehicle mobile station provided in a conceivable technique includes a reception data congestion determination unit, a reception data priority determination unit, an ACK transmission control unit, and an ACK transmission unit. When the reception data congestion determination unit notifies the occurrence of congestion, the reception data priority determination unit instructs the ACK transmission control unit to reduce the transmission speed of the packet belonging to the application having a low priority. Upon receiving this instruction, the ACK transmission control unit reduces the frequency of instructing the transmission of the ACK signal to the reception data of the corresponding application.

SUMMARY

According to an example, a target communication line defined as a congestion determination target and a client that transmits an ACK signal to a communication partner in a case where a signal is received from the communication partner are relayed to each other. It is determined whether a congestion occurs on a target communication line. A communication of the ACK signal is limited by a capture process that captures the signal communicated by the client in a case where determining that the congestion occurs on the target communication line.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

The technique provided in the conceivable technique instructs the ACK transmission control unit to transmit the ACK signal. However, although the communication line is shared, it is not possible to instruct the transmission timing of the ACK signal to other clients that separately transmit the ACK signal. Therefore, it is difficult for the technique disclosed in the conceivable technique to reduce the congestion of the communication line used for communication of other devices.

The present embodiments has been made based on this circumstance, and an object of the present embodiments is to provide a relay device and a relay method that can easily reduce congestion of a communication line used for communication by a client.

One embodiment relating to a relay device for achieving the above object is a relay device that relays between a target communication line defined as a congestion determination target and a client that transmits an ACK signal to a communication partner when a signal is received from the communication partner, and the relay device includes:
 a congestion determination unit that determines whether a congestion occurs on the target communication line; and
 a limitation unit that limits the communication of the ACK signal by a capturing process that captures the signal communicated by the client when the congestion determination unit determines that the congestion occurs on the target communication line.

According to this relay device, it is possible to reduce the congestion of the communication line used for the communication by the client.

One embodiment relating to a relay method for achieving the above object is a relay method that relays between a target communication line defined as a congestion determination target and a client that transmits an ACK signal to a communication partner when a signal is received from the communication partner, and the relay method includes:
 determining whether a congestion occurs on a target communication line; and
 limiting the communication of the ACK signal by a capturing process that captures the signal communicated by the client when determining that the congestion occurs on the target communication line.

First Embodiment

Figure 1:
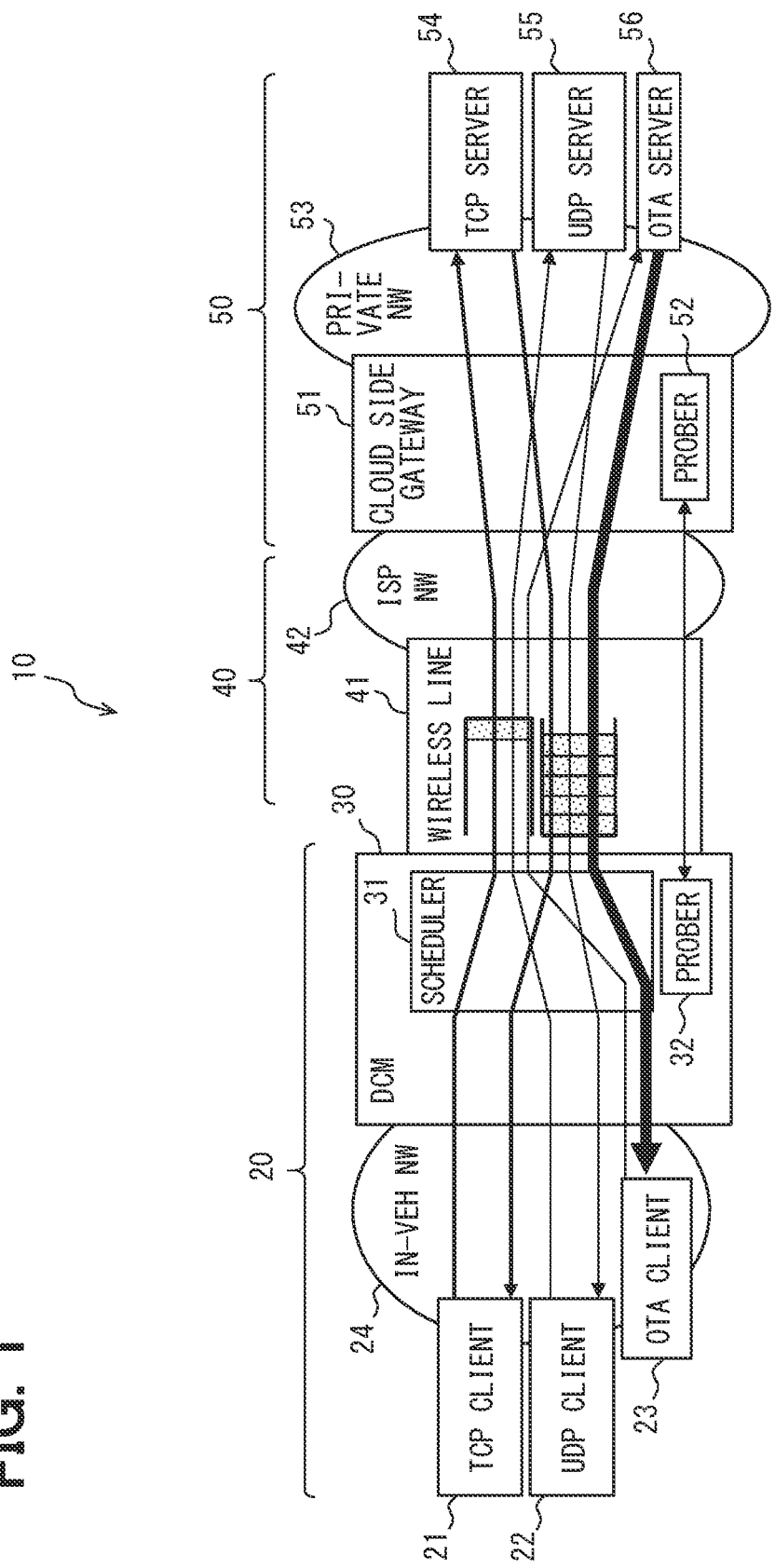
FIG. 1 is an overall configuration diagram of a communication system according to the first embodiment.

<Overall Configuration>
The following will describe embodiments of the present disclosure with reference to the drawings. FIG. 1 is a diagram showing an overall configuration of the communication system 10. The communication system 10 includes a client-side system 20, a relay network unit 40, and a server-side system 50.

In this embodiment, the client-side system 20 is a system mounted on a vehicle. The client-side system 20 includes a plurality of clients, that is, a TCP client 21, a UDP client 22, and an OTA client 23. A client indicates an element that sends and receives data to and from other elements. The client may be hardware or software. Also, one client may include hardware and software.

The TCP client 21 is a client that communicates by TCP (Transmission Control Protocol), which is one of the communication protocols. Connection-oriented communication is executed in TCP. Therefore, the TCP client 21 is a connection-oriented client. In the TCP, when data is received, an ACK signal, which is a signal for transmitting that the data has been received, is transmitted to the data transmission source. Each time the data transmission source receives the ACK signal, the data transmission source transmits the next data to the communication destination. Here, the reception window size Rwin can be set on the data reception side, and the data transmission source can transmit the next data without receiving the ACK signal within the range not exceeding the reception window size Rwin.

The TCP client 21 is mounted on, for example, one ECU (Electronic Control Unit), and transmits data received from another device in the vehicle to the TCP server 54 included in the server-side system 50.

The UDP client 22 is a client that communicates by UDP (User Datagram Protocol), which is one of the communication protocols. In the UDP, connectionless type communication is executed, and data is continuously transmitted without waiting for a response from the communication partner. The UDP client 22 is mounted on an ECU different from the ECU on which the TCP client 21 is mounted, and transmits voice data at the time of a telephone call to the UDP server 55 included in the server-side system 50.

The OTA client 23 also communicates by TCP. Therefore, the OTA client 23 is also a connection-oriented client. The OTA client 23 is a client that receives an update program for a program executed by an ECU or the like mounted on the vehicle.

These three clients are just an example. The client-side system 20 includes a plurality of clients, and one or more of them may be connection-oriented clients. As an example different from FIG. 1, instead of the UDP client 22, a client that communicates by TCP may be provided in addition to the TCP client 21 and the OTA client 23.

The three clients 21, 22, and 23 can communicate with the DCM (Data Communication Module) 30 by the in-vehicle network 24. The in-vehicle network 24 may be partially or wholly wired or wireless. An example of the in-vehicle network 24 is Ethernet.

The DCM 30 is a relay device for relaying communication, and executes a relay method for relaying communication between the wireless line 41 and the clients 21, 22, and 23. The DCM 30 transmits the data acquired from the clients 21, 22, and 23 to the server-side system 50 via the relay network unit 40. Further, the data transmitted from the server-side system 50 is received, and the data is transmitted to the clients 21, 22, and 23 as a data transmission target.

The DCM 30 is a wireless communication device capable of communicating via the relay network unit 40. The DCM 30 includes a scheduler 31 and a prober 32. The scheduler 31 adjusts the timing of transmitting and receiving signals to and from the wireless line 41. The prober 32 adds a time stamp to the signal to be transmitted to the wireless line 41.

The relay network unit 40 includes a wireless line 41 and an ISP network 42. The wireless line 41 is a line with a device capable of connecting to the ISP network 42, for example, a base station device included in a wide area mobile communication system. Therefore, the wireless line 41 is a wireless line that uses a frequency band determined by the wide area mobile communication system. The wireless line 41 is a target communication line that is subject to a congestion determination target. In the wireless line 41 of FIG. 1, the box that opens in the left direction and the box that opens in the right direction conceptually indicate the degree of data congestion from the opening direction, respectively. In addition, the arrow lines penetrating these boxes indicate data, the thickness of the line conceptually indicates the amount of data, and the direction of the arrow indicates the direction of data transmission. In the state shown in FIG. 1, the wireless line 41 is congested in the direction of transmitting data from the server-side system 50 to the client-side system 20.

The ISP network 42 is a communication network that can use the Internet. If communication between the client-side system 20 and the server-side system 50 is possible, a system using a private network may be used instead of the ISP network 42.

The cloud side gateway 51 included in the server-side system 50 can be connected to the ISP network 42. Further, the cloud side gateway 51 can communicate with three servers, that are, a TCP server 54, a UDP server 55, and an OTA server 56 via a private network 53. The cloud side gateway 51 includes a prober 52. The prober 52, similar to the prober 32 included in the DCM30, adds a time stamp to the transmission data.

The private network 53 may be a wired network or a wireless network. Further, the network may be a mixture of wired and wireless.

The TCP server 54 is a server corresponding to the TCP client 21, and communicates with the TCP client 21 by TCP. The UDP server 55 is a server corresponding to the UDP client 22, and communicates with the UDP client 22 by UDP. The OTA server 56 is a server corresponding to the OTA client 23, and communicates with the OTA client 23. That is, the TCP server 54 and the TCP client 21, the UDP server 55 and the UDP client 22, and the OTA server 56 and the OTA client 23 are communication partners with each other, respectively.

[Detailed Configuration of DCM30]

Figure 2:
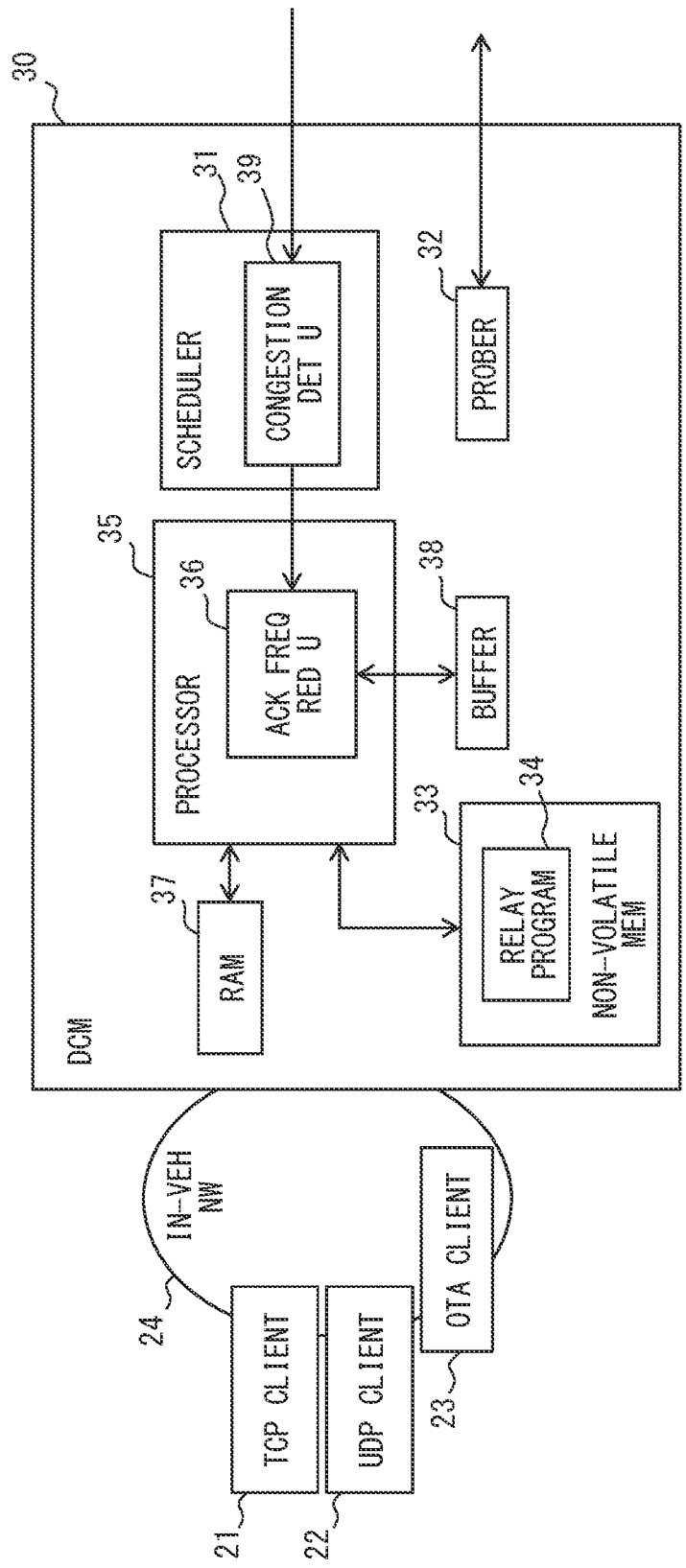
FIG. 2 is a detailed configuration diagram of DCM.

FIG. 2 shows the detailed configuration of the DCM30. The DCM 30 includes a non-volatile memory 33, a processor 35, a RAM 37, and a buffer 38, as shown in FIG. 2, in addition to the scheduler 31 and the prober 32. Of course, the DCM30 also includes a communication circuit.

The non-volatile memory 33 is, for example, a flash memory. The non-volatile memory 33 stores a relay program 34 executed by the processor 35.

The processor 35 executes the relay program 34 while using the temporary storage function of the RAM 37. By executing the relay program 34, the processor 35 functions as the ACK frequency reduction unit 36. Further, the scheduler 31 is also configured to include a processor, and the scheduler 31 also executes the relay program 34. The scheduler 31 functions as a congestion determination unit 39 by executing the relay program 34. The processor 35 may execute a part or all of the functions of the scheduler 31. Therefore, the processor 35 may function as the congestion determination unit 39.

The buffer 38 is a portion that temporarily stores the signal received from the wireless line 41. A part of the RAM 37 may function as the buffer 38.

The congestion determination unit 39 sequentially determines whether or not congestion has occurred in the wireless line 41. When the congestion determination unit 39 determines that the wireless line 41 is congested, the ACK frequency reduction unit 36 executes a capture process for capturing a signal to the OTA client 23, whereby the congestion determination unit 39 reduces the communication frequency of the ACK signal to be transmitted by the OTA client 23. In other words, the ACK frequency reduction unit 36 is a limiting unit, and when the congestion determination unit 39 determines that the congestion has occurred in the wireless line 41, the ACK frequency reduction unit 36 executes a capture process for capturing a signal to the OTA client 23, so that the ACK frequency reduction unit 36 restricts the communication of the ACK signal of the OTA client 23.

Figure 3:
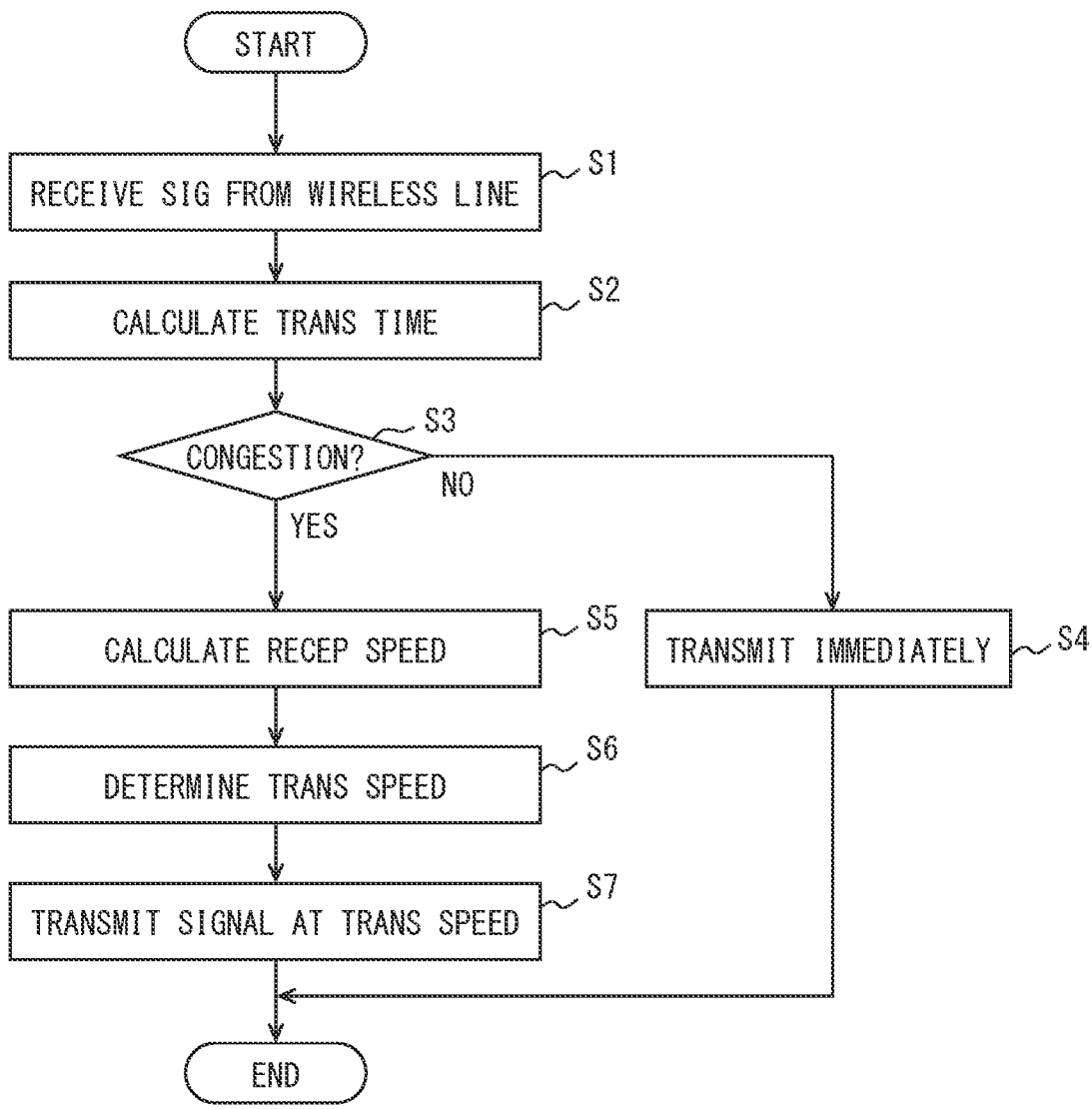
FIG. 3 is a flowchart showing a process executed by a congestion determination unit and an ACK frequency reduction unit.

FIG. 3 is a flowchart showing a process executed by a congestion determination unit 39 and an ACK frequency reduction unit 36. The congestion determination unit 39 and the ACK frequency reduction unit 36 periodically execute the process shown in FIG. 3. In FIG. 3, S1, S2, and S3 are executed by the congestion determination unit 39, and S4 and below steps are executed by the ACK frequency reduction unit 36.

In S1, a signal is received from the wireless line 41. This signal includes a time stamp given by the prober 52. In S2, the transmission time is calculated from the reception time of the signal and the time stamp included in the received signal.

In S3, it is determined whether or not the wireless line 41 is congested based on the transmission time calculated in S2. If the transmission time calculated in S2 exceeds the preset threshold time, it is determined that congestion has occurred. Further, it may be determined that congestion has occurred when the transmission time calculated in S2 tends to increase. The tendency of the transmission time to increase can be determined, for example, by whether or not the rate of increase in the transmission time calculated sequentially is equal to or greater than the threshold value.

If the determination result of S3 is NO, that is, if it is determined that no congestion has occurred, the process proceeds to S4. In S4, the received signal is immediately transmitted to the destination client. After executing S4, the process returns to S1.

If the determination result of S3 is YES, that is, if it is determined that congestion has occurred, the process proceeds to S5. In S5, among the signals received from the wireless line 41, the reception speed of the signal whose transmission speed is lowered by being captured by the buffer 38 is calculated. Which client the signal transmitted to is captured in the buffer 38 is predetermined. In the present embodiment, the signal captured in the buffer 38 is only the signal transmitted to the OTA client 23. The signal transmitted to the TCP client 21 is not captured in the buffer 38. The signal received by the OTA client 23 is relatively less urgent. Therefore, in the present embodiment, only the signal transmitted to the OTA client 23 is captured in the buffer 38. In addition, the OTA client 23 has a relatively large receive window size as compared to other clients. Therefore, by reducing the speed of the signal received by the OTA client 23, congestion can be efficiently reduced.

In S6, the transmission speed at which the signal is transmitted to the OTA client 23 is determined to be lower than the reception speed calculated in S5. It can be variously determined how much the transmission speed is lowered with respect to the reception speed calculated in S5. For example, the transmission speed may be the speed obtained by subtracting a preset constant value from the reception speed calculated in S5. Further, the greater the degree of congestion, the greater the degree to which the transmission speed is reduced with respect to the reception speed. Further, the transmission speed may be a speed obtained by multiplying the reception speed calculated in S5 by a coefficient smaller than 1 which is preliminarily determined.

In S7, among the signals received from the wireless line 41, the signal transmitted to the OTA client 23 is input into the buffer 38. Then, the signal is transmitted from the buffer 38 to the OTA client 23 at the transmission speed determined in S6. Whether or not the signal is transmitted to the OTA client 23 is determined based on the IP address included in the header of the signal or the destination port number. The process in S7 is the capture process. After execution in S7, the process returns to S1.

[Flow to Reduce Congestion]

By executing the process of FIG. 3 described above, the congestion occurring in the wireless line 41 is reduced in the order described below. When executing S7, signals destined for the OTA client 23 are accumulated in the buffer 38. As a result, the speed at which the OTA client 23 receives the signal is lower than when the signal is not accumulated in the buffer 38. Further, the transmission speed of all the signals transmitted by the DCM30 is lower than the total reception speed of all the signals received by the DCM30.

Figure 4:
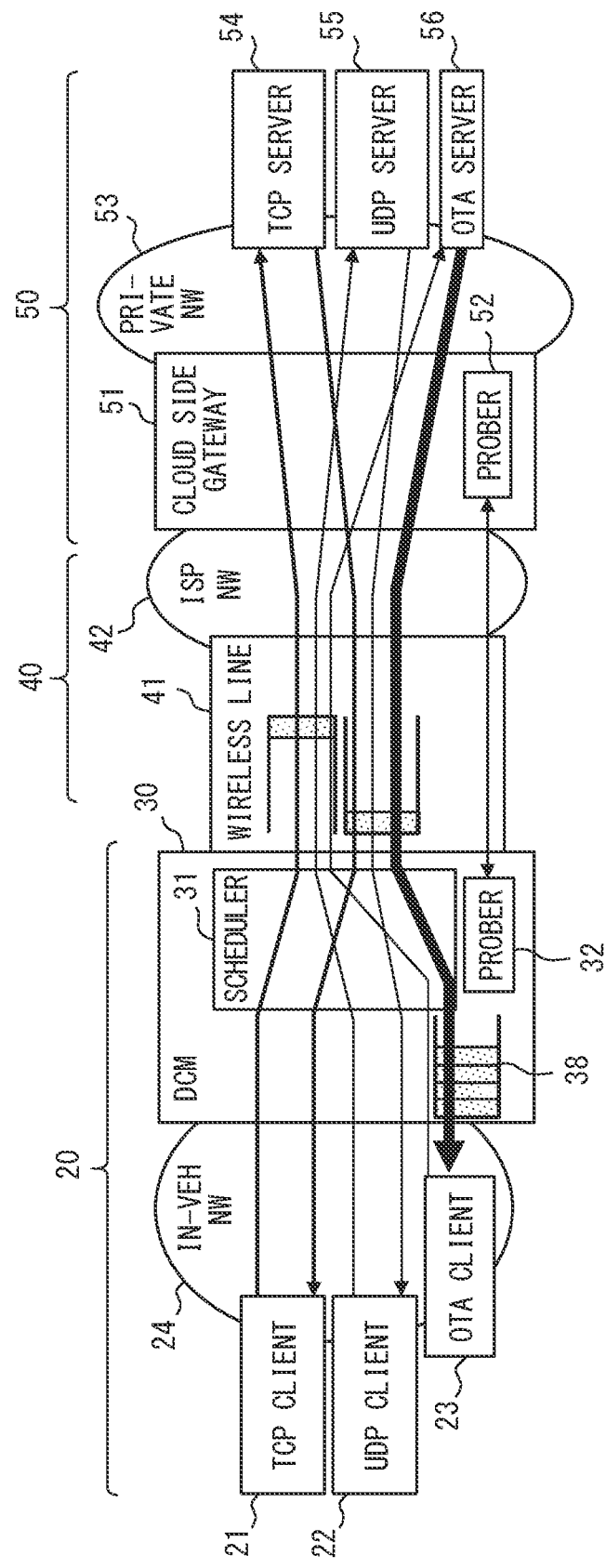
FIG. 4 is a diagram showing a state in which congestion generated in a wireless line is reduced.

Since the OTA client 23 is a client that communicates by TCP, when the reception speed decreases, the frequency of transmitting the ACK signal decreases. The frequency of the reception of the ACK signal by the OTA server 56 is reduced. Therefore, it takes a long time for the OTA server 56 to transmit the signal. That is, the transmission speed at which the OTA server 56 transmits a signal to the OTA client 23 decreases. The signal transmitted by the OTA server 56 to the OTA client 23 is a signal passing through the wireless line 41. Therefore, as the transmission speed of the signal decreases, as shown in FIG. 4, although the signal is accumulated in the buffer 38, the congestion generated in the wireless line 41 is reduced.

Further, the process of S7 for reducing the transmission frequency of the ACK signal is a process of capturing the signal transmitted to the OTA client 23 by the DCM30. Therefore, it is not necessary to instruct the OTA client 23 at the transmission timing of the ACK signal. Therefore, it is easy to reduce the congestion of the wireless line 41 shared by the plurality of clients 21, 22, and 23.

Further, it is not necessary to instruct the OTA client 23 to transmit the ACK signal, and it is not necessary to detect the ACK signal or to delay the ACK signal. Also in this respect, it is easy to reduce the congestion of the wireless line 41.

In addition, the signal captured by the capture process is only the signal transmitted to the OTA client 23. The signal transmitted to the OTA client 23 is captured, so that the communication speed is reduced. Here, for the uncaptured signal, the congestion of the wireless line 41 is reduced, so that the communication speed is suppressed from being delayed. Therefore, for example, it is possible to prevent the voice call from being delayed due to the OTA client 23 receiving the update program.

The congestion determination unit 39 determines whether the congestion occurs, based on the time stamp given by the cloud-side gateway 51 when the signal is transmitted to the wireless line 41 and the time when the signal is received from the wireless line 41. By doing so, even if the number of clients increases, the load of the process of determining whether or not congestion is occurring is unlikely to increase.

Second Embodiment

The following describes a second embodiment. In the following description of the second embodiment, elements having the same reference symbols as those used so far are the same as the elements having the same reference symbols in the previous embodiment, except when specifically mentioned. When only a part of the configuration is described, the embodiment described above can be applied to other parts of the configuration.

Figure 5:
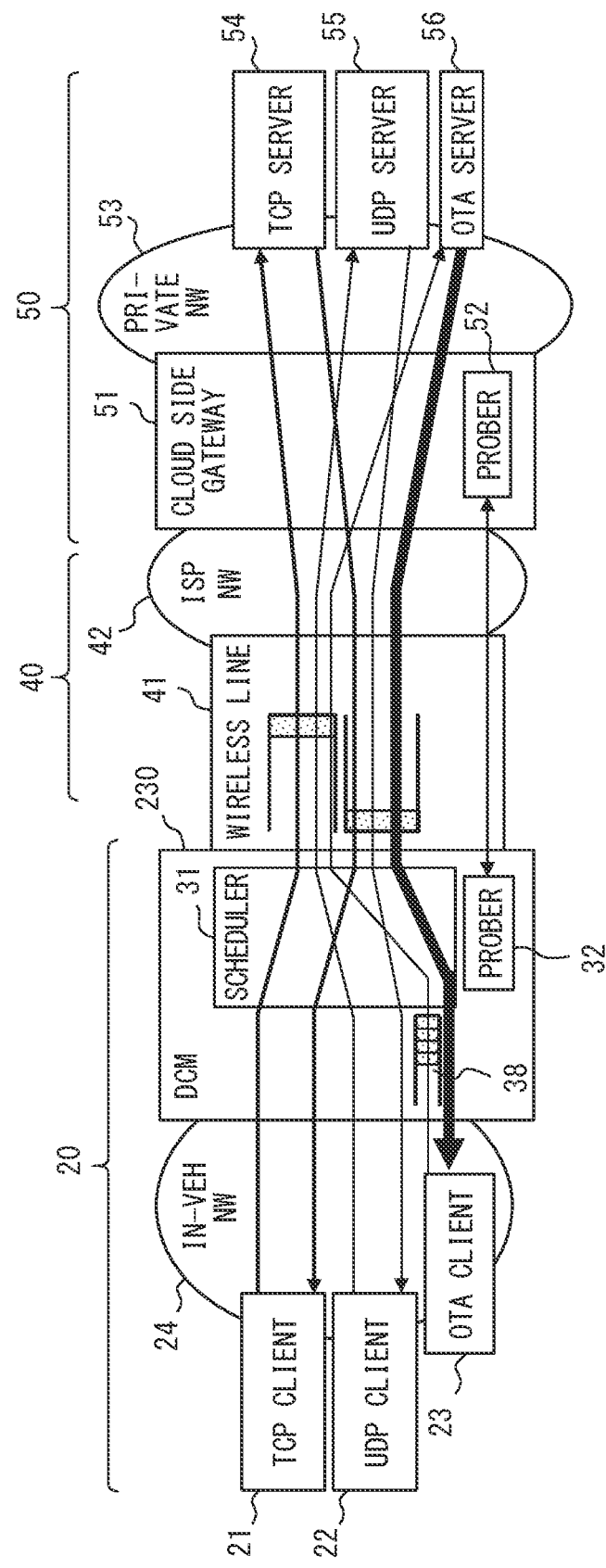
FIG. 5 is an overall configuration diagram of a communication system according to a second embodiment.

FIG. 5 shows the overall configuration of the communication system 210 of the second embodiment. The communication system 210 includes a DCM 230 instead of the DCM 30 of the first embodiment. The DCM 230 differs from the first embodiment in the signal stored in the buffer 38. As shown in FIG. 5, the DCM 230 captures the signal transmitted by the OTA client 23. Further, the DCM 230 includes an ACK frequency reduction unit 236 (see FIG. 6) in place of the ACK frequency reduction unit 36 of the first embodiment. The scheduler 31 included in the DCM 230 includes a congestion determination unit 39 as in the first embodiment.

Figure 6:
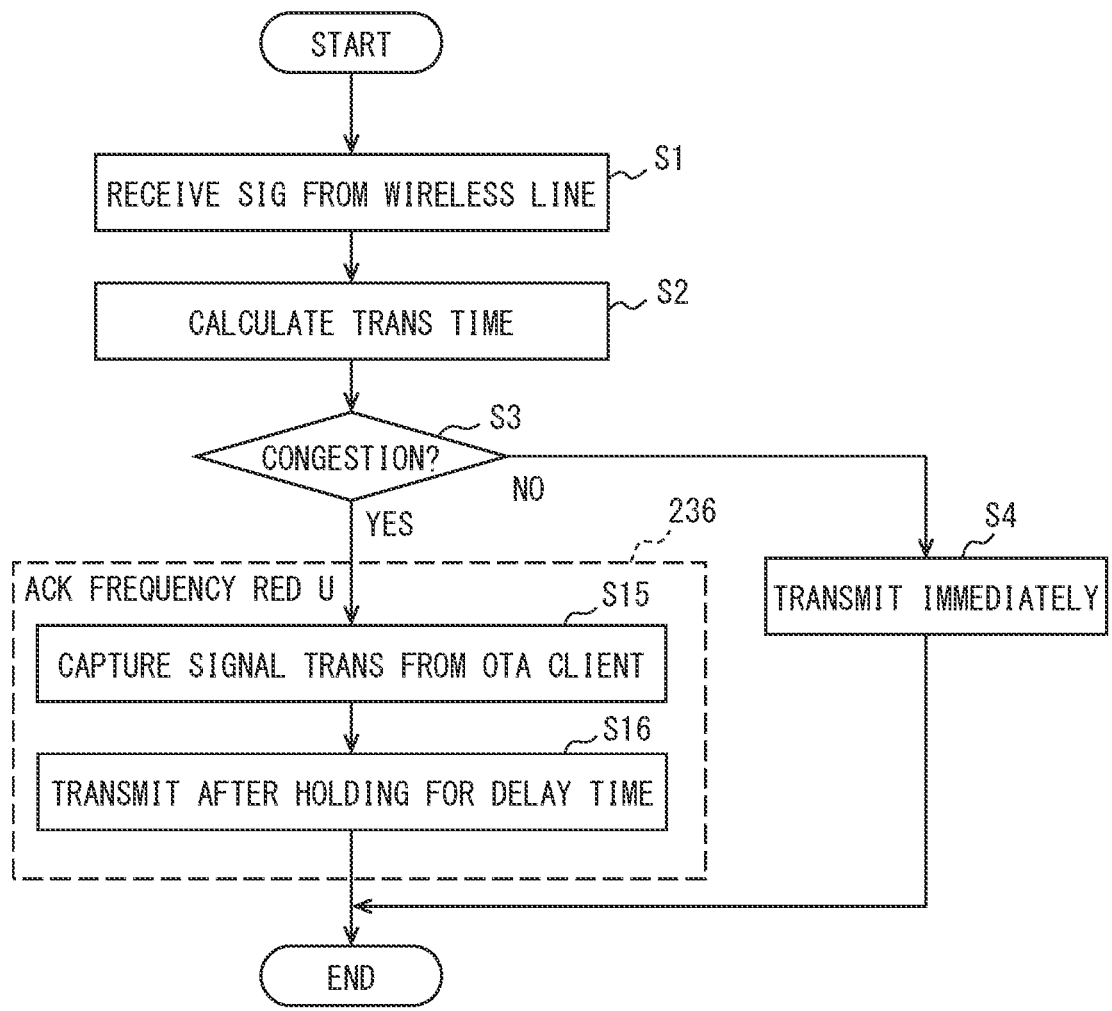
FIG. 6 is a flowchart showing a process executed by a congestion determination unit and an ACK frequency reduction unit in the second embodiment.

FIG. 6 is a flowchart showing a process executed by a congestion determination unit 39 and an ACK frequency reduction unit 236 in the second embodiment. In the second embodiment, when the determination result of S3 is YES, that is, when it is determined that the wireless line 41 is congested, the ACK frequency reduction unit 236 executes steps S15 and S16.

In S15, the signal transmitted by the OTA client 23 is captured and input into the buffer 38. The signal transmitted by the OTA client 23 includes an ACK signal. Therefore, in S15, at least, the ACK signal transmitted by the OTA client 23 is captured.

In S16, the signal put in the buffer 38 is transmitted to the wireless line 41 after holding the predetermined delay time. The delay time may be determined in various ways. For example, the delay time may be a preset fixed time. Further, the larger the degree of congestion, the larger the delay time may be. The processes of S15 and S16 are capture processes.

Execution of S15 and S16 also reduces the frequency with which the OTA server 56 receives the ACK signal. Therefore, even in the second embodiment, the congestion generated in the wireless line 41 is reduced.

Further, in the second embodiment, the process for reducing the frequency of receiving the ACK signal by the OTA server 56 is the process of capturing the signal transmitted from the OTA client 23 using the DCM 230. Also in the second embodiment, since it is not necessary to instruct the OTA client 23 to transmit the ACK signal, it is easy to reduce the congestion of the wireless line 41 shared by the plurality of clients 21, 22, and 23.

In the second embodiment, the ACK frequency reduction unit 236 captures all the signals transmitted by the OTA client 23 (at S15). In this case, it is sufficient to check the IP header of the signal. Therefore, the processing load in S15 can be reduced.

Third Embodiment

Figure 7:
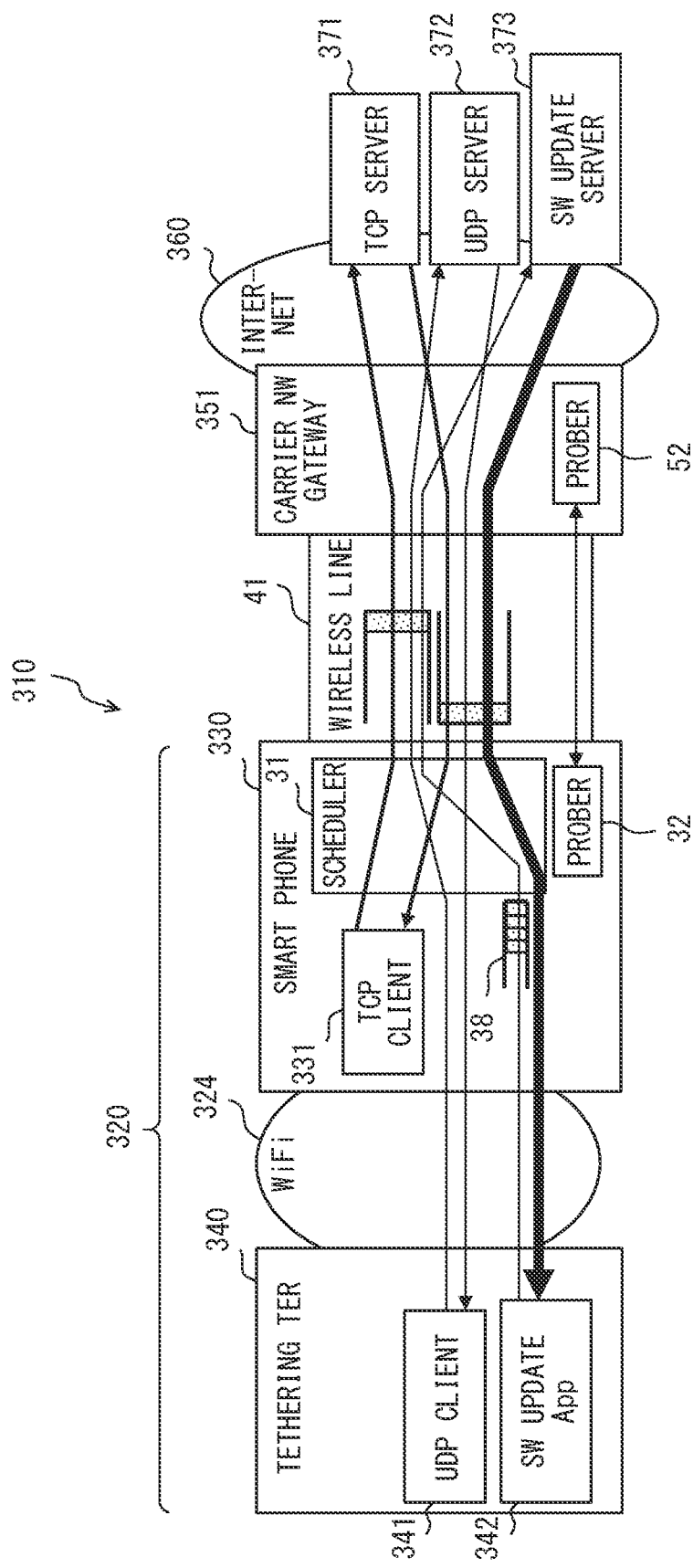
FIG. 7 is an overall configuration diagram of a communication system according to the third embodiment.

FIG. 7 shows the overall configuration of the communication system 310 of the third embodiment. The communication system 310 includes a smartphone 330 and a tethering terminal 340 as a client-side system 320.

The smartphone 330 is a device provided with a client as well as a relay device. The smartphone 330 includes the scheduler 31, the prober 32, and the buffer 38 described in the first and second embodiments. Further, the smartphone 330 includes a TCP client 331. The TCP client 331 is a client that communicates by TCP. The TCP client 331 is, for example, a web browser application, a mail application, or the like.

The tethering terminal 340 is a tablet terminal, a mobile computer, a smartphone different from the smartphone 330, and the like. The tethering terminal 340 includes a UDP client 341 and a software update application 342.

The UDP client 341 is a client that communicates by UDP. The UDP client 341 is, for example, a video streaming application.

The software update application 342 is an application for updating software executed by the tethering terminal 340. The software update application 342 communicates by TCP.

The smartphone 330 and the tethering terminal 340 are connected by a WiFi 324, which is an example of narrow-range wireless communication. The smartphone 330 relays communication between the UDP client 341 included in the tethering terminal 340, the software update application 342, and the wireless line 41. The TCP client 331 included in the smartphone 330 is also relayed for communication with the wireless line 41 by the communication device included in the smartphone 330.

The carrier network gateway 351 is a gateway that connects to the Internet 360. The carrier network gateway 351 includes the same prober 52 as that provided by the cloud-side gateway 51.

The TCP server 371 is a server corresponding to the TCP client 331, and communicates with the TCP client 331 by TCP. The UDP server 372 is a server corresponding to the UDP client 341, and communicates with the UDP client 341 by UDP. The software update server 373 is a server corresponding to the software update application 342 and communicates with the software update application 342. That is, the TCP server 371 and the TCP client 331, the UDP server 372 and the UDP client 341, and the software update server 373 and the software update application 342 are communication partners with each other.

The scheduler 31 included in the smartphone 330 includes a congestion determination unit 39 as in the first and second embodiments. Further, the smartphone 330 includes an ACK frequency reduction unit 236 included in the DCM 230 of the second embodiment.

It is assumed that the wireless line 41 is congested due to the software update application 342 starting the software update in the communication system 310. This congestion is also determined by the congestion determination unit 39 in the third embodiment.

When the congestion determination unit 39 determines that congestion has occurred, the ACK frequency reduction unit 236 delays the signal by capturing the signal transmitted by the software update application 342 and temporarily putting it in the buffer 38. As a result, the congestion of the wireless line 41 is reduced. Therefore, the smartphone 330 can prevent the tethering terminal 340 from slowing down the communication of the TCP client 331 provided by the tethering terminal 340 by executing the software update.

Although the embodiments have been described as above, the disclosed technology is not limited to the above-described embodiments, and the following modifications are also included in the disclosed scope, and various modifications can be made without departing from the spirit of the present disclosure.

(First Modification)

In the second and third embodiments, all the signals transmitted by the client such as the UDP client 22 or the software update application 342, which transmits the ACK signal that reduces the communication frequency, are captured. Here, only the ACK signal among the signals transmitted by the UDP client 22 or the software update application 342 may be transmitted to the wireless line 41 after holding the delay time in the buffer 38. By doing so, it is possible to suppress a decrease in communication speed other than the ACK signal. Whether or not the signal transmitted by the UDP client 22 or the software update application 342 is an ACK signal can be determined based on the ACK flag included in the header.

(Second Modification)

In the embodiment, an example of the ACK frequency reduction unit 36, 236 has described such that the ACK signal is captured and then transmitted to the wireless line 41 after the delay holding time has elapsed. Here, the ACK frequency reduction unit 36, 236 may capture a part of the plurality of ACK signals and then discard them. Even in this way, the communication frequency of the ACK signal can be reduced.

(Third Modification)

In the embodiment, the ACK frequency reduction units 36 and 236 capture the ACK signal. Alternatively, if the ACK signal is captured somewhere in the communication path, the communication frequency of the ACK signal can be reduced. Therefore, as a capture process, the ACK frequency reduction unit may instruct the other party side relay device provided in the communication path between the wireless line 41 and the communication partner to capture the ACK signal and to reduce the communication frequency of the ACK signal.

The relay device on the other party side is the cloud-side gateway 51 in the second embodiment, and the carrier network gateway 351 in the third embodiment. The process after capturing the ACK signal may be a process of transmitting after holding the delay time, or a process of discarding a part of a plurality of ACK signals.

(Fourth Modification)

Whether or not the wireless line 41 is congested can also be estimated from the size of the allocated bandwidth allocated to the client-side systems 20 and 320 when the wireless line 41 is used. This is because if the allocated bandwidth is narrowed, congestion is likely to occur. Therefore, if the information on the allocated band can be acquired, the congestion determination unit 39 may determine whether the wireless line 41 is congested based on the width of the allocated band.

Further, if the queue length is long in the base station, it may be estimated that congestion has occurred. Therefore, when the information on the queue length of the base station can be acquired, the congestion determination unit 39 may determine whether the wireless line 41 is congested based on the queue length of the base station.

(Fifth Modification)

In the embodiment, the ACK signal that reduces the communication frequency is only the ACK signal transmitted by one client. Alternatively, the communication frequency of the ACK signals transmitted by two or more connection-oriented clients may be reduced.

(Sixth Modification)

A plurality of types of capture processes described above may be combined.

(Seventh Modification)

In the following description, the control unit indicates an element that executes the ACK frequency reduction unit 36, the ACK frequency reduction unit 236, and the congestion determination unit 39.

The control units and the method thereof described in the present disclosure may be implemented by a special purpose computer including a processor programmed to perform one or more functions implemented by a computer program. Alternatively, the control unit and the method described in the present disclosure may be implemented by a dedicated hardware logic circuit. Alternatively, the control unit and the method described in the present disclosure may be implemented by one or more dedicated computers configured by a combination of a processor executing a computer program and one or more hardware logic circuits. The hardware logic circuits may be, for example, ASIC or FPGA.

Further, the storage medium for storing the computer program is not limited to the ROM, and it may also be stored in a computer-readable non-transitory tangible storage medium as instructions to be executed by the computer. For example, the above program may be stored in a flash memory.

According to the above-described embodiment, when the congestion determination unit determines that congestion has occurred on the target communication line, the ACK frequency reduction unit limits the communication of the ACK signal. Since it is connection-oriented communication, by limiting the communication of the ACK signal, the speed at which the communication partner transmits the signal also decreases. Therefore, the congestion of the target communication line is reduced. Note that communication means performing at least one of transmission and reception.

Further, the process that reduces the communication frequency of the ACK signal is a capture process for capturing the signal communicated by the client. Since it is sufficient to capture the signal that the client communicates with, it is not necessary to instruct the client at the transmission timing when to transmit the ACK signal. Therefore, it is easy to reduce the congestion of the communication line shared by a plurality of clients that separately transmit the ACK signal.

In addition, the signal captured by the capture process is a signal transmitted by a part of the clients. Here, for the uncaptured signal, the congestion of the target communication line is reduced, so that the communication speed is suppressed from being delayed.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or the processing of the flowchart in the present application includes sections (also referred to as steps), each of which is represented, for instance, as S1. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A relay device for relaying between a target communication line defined as a congestion determination target and a client that transmits an acknowledgement (ACK) signal to a communication partner in a case where a signal is received from the communication partner, the relay device comprising:
   a congestion determination means for determining whether a congestion occurs on the target communication line; and
   a limitation means for limiting communication of the ACK signal by a capture process that captures the signal communicated by the client in a case where the congestion determination means determines that the congestion occurs on the target communication line;
   wherein:
   the signal to be captured in the capture process is a signal received from the target communication line and has a destination which is the client;
   in the capture process, a transmission speed of a captured signal for transmitting to the client is set to be lower than a reception speed of the captured signal; and
   the transmission speed of the captured signal is set to be lower than the reception speed by at least one of: subtracting a preset constant value from the reception speed of the captured signal; increasing a degree to which the transmission speed is reduced with respect to the reception speed as a degree of the congestion increases; multiplying the reception speed of the captured signal by a coefficient smaller than 1 which is preliminarily determined; and setting the transmission speed to be a predetermined speed when the reception speed is larger than another predetermined speed.

2. The relay device according to claim 1, wherein:
   in the capture process, a capture of the ACK signal and a limitation of communication of the ACK signal is instructed to a communication partner relay device located on a communication path between the target communication line and the communication partner.

3. The relay device according to claim 1, wherein:
   the congestion determination means calculates a transmission time based on a time stamp added to the signal when the signal is transmitted to the target communication line and a chronological time when the signal to which the time stamp is attached is received, and determines whether the congestion occurs based on the transmission time.

4. A relay device comprising:
   one or more processors, wherein:
   the one or more processors performs:
   relaying between a target communication line defined as a congestion determination target and a client that transmits an acknowledgement (ACK) signal to a communication partner in a case where a signal is received from the communication partner, the relay device;
   determining whether a congestion occurs on the target communication line; and
   limiting communication of the ACK signal by a capture process that captures the signal communicated by the client in a case where it is determined that the congestion occurs on the target communication line;
   wherein:
   the signal to be captured in the capture process is a signal received from the target communication line and has a destination which is the client;
   in the capture process, a transmission speed of a captured signal for transmitting to the client is set to be lower than a reception speed of the captured signal; and
   the transmission speed of the captured signal for transmitting to the client is set to be lower by at least one of: subtracting a preset constant value from the reception speed of the captured signal; increasing a degree to which the transmission speed is reduced with respect to the reception speed as a degree of the congestion increases; multiplying the reception speed of the captured signal by a coefficient smaller than 1 which is preliminarily determined; and setting the transmission speed to be a predetermined speed when the reception speed is larger than another predetermined speed.

5. The relay device according to claim 4, wherein:
   in the capture process, a capture of the ACK signal and a limitation of communication of the ACK signal is instructed to a communication partner relay device located on a communication path between the target communication line and the communication partner.

6. The relay device according to claim 4, wherein:
   the one or more processors calculates a transmission time based on a time stamp added to the signal when the signal is transmitted to the target communication line and a chronological time when the signal to which the time stamp is attached is received, and determines whether the congestion occurs based on the transmission time.

7. A relay method for relaying between a target communication line defined as a congestion determination target and a client that transmits an acknowledgement (ACK) signal to a communication partner in a case where a signal is received from the communication partner, the relay method comprising:
   determining whether a congestion occurs on a target communication line; and
   limiting a communication of the ACK signal by a capture process that captures the signal communicated by the client in a case where determining that the congestion occurs on the target communication line;
   wherein:
   the signal to be captured in the capture process is a signal received from the target communication line and has a destination which is the client;
   in the capture process, a transmission speed of a captured signal for transmitting to the client is set to be lower than a reception speed of the captured signal; and
   wherein the transmission speed of the captured signal for transmitting to the client is set to be lower by at least one of: subtracting a preset constant value from the reception speed of the captured signal; increasing a degree to which the transmission speed is reduced with respect to the reception speed as a degree of the congestion increases; multiplying the reception speed of the captured signal by a coefficient smaller than 1 which is preliminarily determined; and setting the transmission speed to be a predetermined speed when the reception speed is larger than another predetermined speed.

8. A non-transitory tangible computer readable storage medium comprising instructions being executed by a computer, the instructions including a computer-implemented method for relaying between a target communication line defined as a congestion determination target and a client that transmits an acknowledgement (ACK) signal to a communication partner in a case where a signal is received from the communication partner, the instructions including:
- determining whether a congestion occurs on a target communication line; and
- limiting a communication of the ACK signal by a capture process that captures the signal communicated by the client in a case where determining that the congestion occurs on the target communication line;

wherein:
- the signal to be captured in the capture process is a signal received from the target communication line and has a destination which is the client;
- in the capture process, a transmission speed of a captured signal for transmitting to the client is set to be lower than a reception speed of the captured signal; and
- wherein the transmission speed of the captured signal is set to be lower by at least one of: subtracting a preset constant value from the reception speed of the captured signal; increasing a degree to which the transmission speed is reduced with respect to the reception speed as a degree of the congestion increases; multiplying the reception speed of the captured signal by a coefficient smaller than 1 which is preliminarily determined; and setting the transmission speed to be a predetermined speed when the reception speed is larger than another predetermined speed.

* * * * *